US012699854B1

(12) United States Patent
Bi et al.

(10) Patent No.: US 12,699,854 B1
(45) Date of Patent: Aug. 4, 2026

(54) ADAPTIVE CONFIDENCE-BASED REASONING CONTROL FOR LARGE LANGUAGE MODELS

(71) Applicant: Intuit Inc., Mountain View, CA (US)

(72) Inventors: Sirui Bi, Mountain View, CA (US);
Wendi Cui, Jersey City, NJ (US); Wei Wang, San Jose, CA (US); Runhua Zhao, Milpitas, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/346,402

(22) Filed: Sep. 30, 2025

Related U.S. Application Data

(60) Provisional application No. 63/856,011, filed on Aug. 1, 2025.

(51) Int. Cl.
| | |
|---|---|
| *G06F 40/40* | (2020.01) |
| *G06F 40/284* | (2020.01) |
| *H04L 51/02* | (2022.01) |

(52) U.S. Cl.
CPC ............ *G06F 40/40* (2020.01); *G06F 40/284* (2020.01); *H04L 51/02* (2013.01)

(58) Field of Classification Search
None
See application file for complete search history.

(56) References Cited

U.S. PATENT DOCUMENTS

| | | | | |
|---|---|---|---|---|
| 2024/0104391 A1* | 3/2024 | Higgins | .............. | G06F 16/3329 |
| 2025/0094732 A1* | 3/2025 | Aggarwal | .............. | G06F 40/40 |
| 2025/0139411 A1* | 5/2025 | Murthy | .............. | G06N 3/0455 |
| 2025/0148203 A1* | 5/2025 | Pan | .......................... | G10L 15/26 |
| 2025/0181791 A1* | 6/2025 | Cook | .................... | G06F 30/27 |
| 2025/0190741 A1* | 6/2025 | Kim | ....................... | G06N 3/006 |
| 2025/0238629 A1* | 7/2025 | Malkiel | ................. | G06F 40/194 |
| 2025/0307598 A1* | 10/2025 | Trudeau | .............. | G06N 3/0455 |

OTHER PUBLICATIONS

Wang L. Dynamic chain-of-thought: Towards adaptive deep reasoning. arXiv preprint arXiv:2502.10428. Feb. 7, 2025. (Year: 2025).*
Li, Y., et al., "Escape Sky-High Cost: Early-Stopping Self-Consistency for Multi-Step Reasoning", Jan. 19, 2024, 18 pages.
Yang, C., et al., "Dynamic Early Exit in Reasoning Models", May 17, 2025, 23 pages.
Luo, H., et al., "O1-Pruner: Length-Harmonizing Fine-Tuning for O1-Like Reasoning Pruning", Jan. 29, 2025, 10 pages.

* cited by examiner

*Primary Examiner* — Jonathan C Kim
(74) *Attorney, Agent, or Firm* — Lathrop GPM LLP

(57) ABSTRACT

A method includes transmitting a prompt to a large language model (LLM). The prompt includes an instruction to generate a first reasoning block. The method further includes computing a first token-level confidence score for the first reasoning block. The method further includes generating, by the LLM, a second reasoning block responsive to the first token-level confidence score failing to satisfy a pruning threshold. The method further includes computing a second token-level confidence score for the second reasoning block. Responsive to the second token-level confidence score satisfying the pruning threshold, the second reasoning block is added to a reasoning trace. The method further includes generating a provisional answer from the reasoning trace, responsive to the second token-level confidence score satisfying a block confidence threshold.

18 Claims, 5 Drawing Sheets

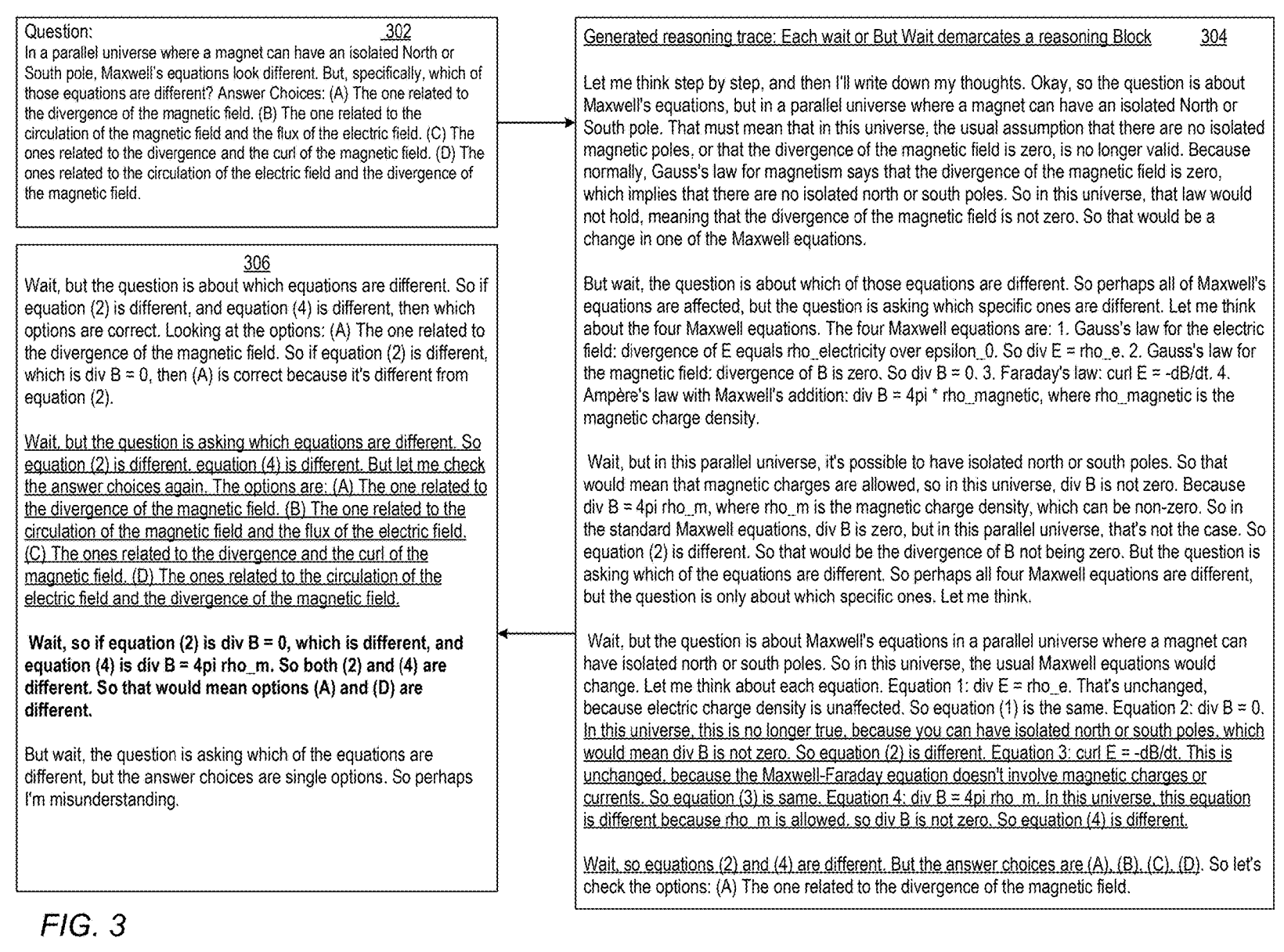

Question:    302

In a parallel universe where a magnet can have an isolated North or South pole, Maxwell's equations look different. But, specifically, which of those equations are different? Answer Choices: (A) The one related to the divergence of the magnetic field. (B) The one related to the circulation of the magnetic field and the flux of the electric field. (C) The ones related to the divergence and the curl of the magnetic field. (D) The ones related to the circulation of the electric field and the divergence of the magnetic field.

306

Wait, but the question is about which equations are different. So if equation (2) is different, and equation (4) is different, then which options are correct. Looking at the options: (A) The one related to the divergence of the magnetic field. So if equation (2) is different, which is div B = 0, then (A) is correct because it's different from equation (2).

Wait, but the question is asking which equations are different. So equation (2) is different, equation (4) is different. But let me check the answer choices again. The options are: (A) The one related to the divergence of the magnetic field. (B) The one related to the circulation of the magnetic field and the flux of the electric field. (C) The ones related to the divergence and the curl of the magnetic field. (D) The ones related to the circulation of the electric field and the divergence of the magnetic field.

Wait, so if equation (2) is div B = 0, which is different, and equation (4) is div B = 4pi rho_m. So both (2) and (4) are different. So that would mean options (A) and (D) are different.

But wait, the question is asking which of the equations are different, but the answer choices are single options. So perhaps I'm misunderstanding.

Generated reasoning trace: Each wait or But Wait demarcates a reasoning Block    304

Let me think step by step, and then I'll write down my thoughts. Okay, so the question is about Maxwell's equations, but in a parallel universe where a magnet can have an isolated North or South pole. That must mean that in this universe, the usual assumption that there are no isolated magnetic poles, or that the divergence of the magnetic field is zero, is no longer valid. Because normally, Gauss's law for magnetism says that the divergence of the magnetic field is zero, which implies that there are no isolated north or south poles. So in this universe, that law would not hold, meaning that the divergence of the magnetic field is not zero. So that would be a change in one of the Maxwell equations.

But wait, the question is about which of those equations are different. So perhaps all of Maxwell's equations are affected, but the question is asking which specific ones are different. Let me think about the four Maxwell equations. The four Maxwell equations are: 1. Gauss's law for the electric field: divergence of E equals rho_electricity over epsilon_0. So div E = rho_e. 2. Gauss's law for the magnetic field: divergence of B is zero. So div B = 0. 3. Faraday's law: curl E = -dB/dt. 4. Ampère's law with Maxwell's addition: div B = 4pi * rho_magnetic, where rho_magnetic is the magnetic charge density.

Wait, but in this parallel universe, it's possible to have isolated north or south poles. So that would mean that magnetic charges are allowed, so in this universe, div B is not zero. Because div B = 4pi rho_m, where rho_m is the magnetic charge density, which can be non-zero. So in the standard Maxwell equations, div B is zero, but in this parallel universe, that's not the case. So equation (2) is different. So that would be the divergence of B not being zero. But the question is asking which of the equations are different. So perhaps all four Maxwell equations are different, but the question is only about which specific ones. Let me think.

Wait, but the question is about Maxwell's equations in a parallel universe where a magnet can have isolated north or south poles. So in this universe, the usual Maxwell equations would change. Let me think about each equation. Equation 1: div E = rho_e. That's unchanged, because electric charge density is unaffected. So equation (1) is the same. Equation 2: div B = 0. In this universe, this is no longer true, because you can have isolated north or south poles, which would mean div B is not zero. So equation (2) is different. Equation 3: curl E = -dB/dt. This is unchanged, because the Maxwell-Faraday equation doesn't involve magnetic charges or currents. So equation (3) is same. Equation 4: div B = 4pi rho_m. In this universe, this equation is different because rho_m is allowed, so div B is not zero. So equation (4) is different.

Wait, so equations (2) and (4) are different. But the answer choices are (A), (B), (C), (D). So let's check the options: (A) The one related to the divergence of the magnetic field.

*FIG. 3*

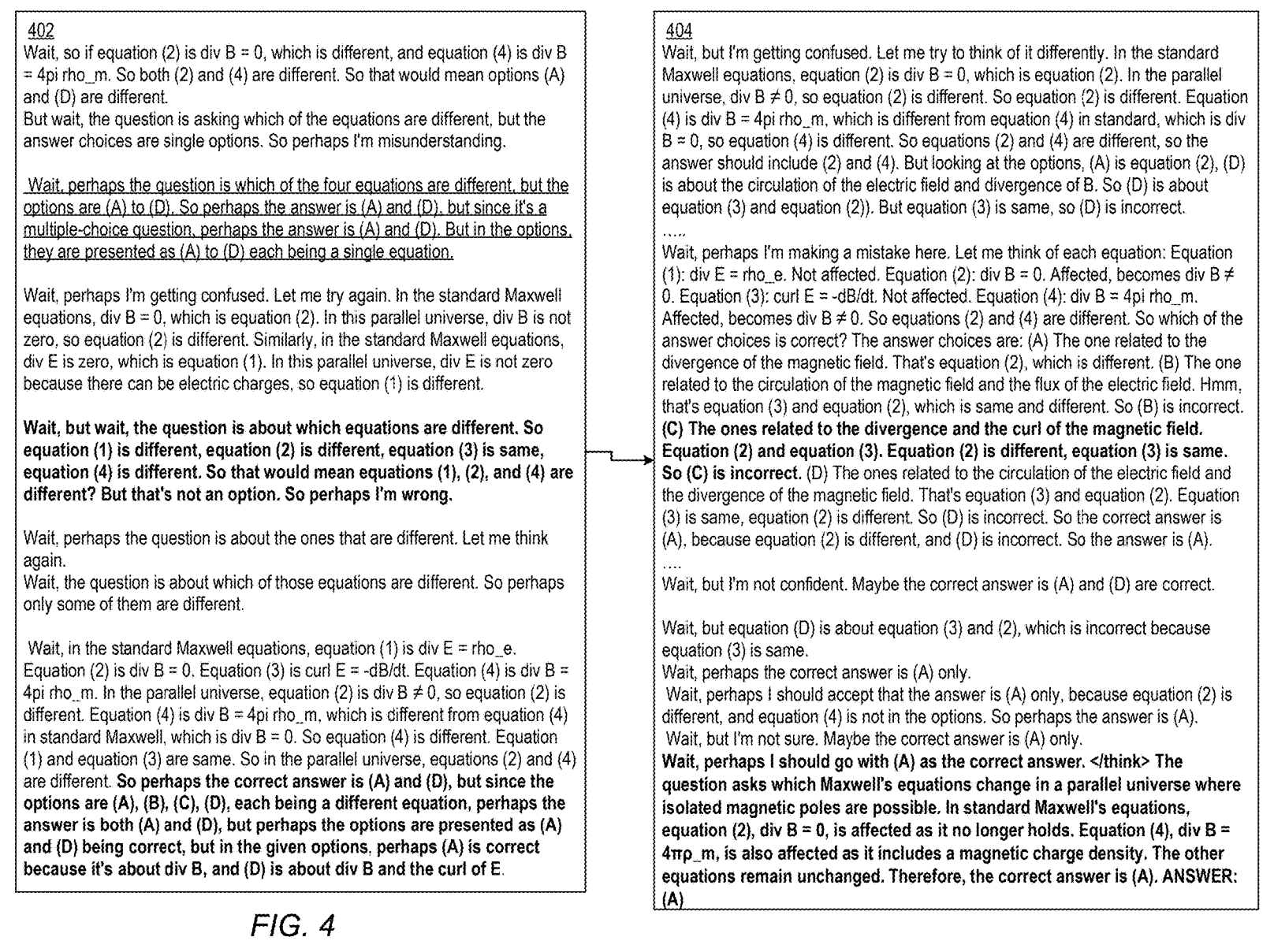

The question asks which Maxwell's equations change in a parallel universe where isolated magnetic poles are possible. In standard Maxwell's equations, equation (2), div B = 0, is affected as it no longer holds. Equation (4), div B = 4πρ_m, is also affected as it includes a magnetic charge density. The other equations remain unchanged. Therefore, the correct answer is (A). ANSWER: (A)

*FIG. 4*

ADAPTIVE CONFIDENCE-BASED REASONING CONTROL FOR LARGE LANGUAGE MODELS

CROSS-REFERENCE TO RELATED APPLICATIONS

This application claims benefit to U.S. provisional application 63/856,011 filed in the United States on Aug. 1, 2025, and which is incorporated herein by reference.

BACKGROUND

Large language models (LLMs) are increasingly used to solve complex reasoning tasks through multi-step generation techniques such as chain-of-thought prompting. In chain-of-thought prompting processes, LLMs may produce extended reasoning traces composed of multiple intermediate steps before arriving at a final answer. Reasoning traces are sequences of reasoning blocks. Reasoning blocks are structured segments of logic used by LLMs to lead to a solution or an answer to a complex multi-step problem. In real-world applications, LLMs using chain-of-thought processes may produce excessively long and redundant reasoning traces. This phenomenon, referred to as overthinking, may lead to increased token consumption, higher inference latency, and elevated operational costs. Moreover, the additional reasoning steps may not consistently improve answer accuracy and may even degrade the accuracy due to exposure bias or propagation of hallucinated content.

Overthinking may occur due to the tendency of LLMs to generate redundant or low-value reasoning blocks, which may include filler phrases or repeated logic. Low-value reasoning blocks may contribute to excessive token usage, increased latency, and elevated computational cost. In some cases, low-value reasoning blocks may degrade the accuracy of the final answer due to propagation of uncertainty or hallucinated content. A challenge arises in estimating the utility of a reasoning block generated during inference to the final answer.

Another challenge arises from the need to determine, during inference, whether the model has reasoned sufficiently to produce a reliable answer. Modifying model architecture to make this determination may reduce portability and increase engineering complexity. External models to make this determination may require labeled data, limiting scalability, and generalization across domains.

SUMMARY

In general, in one aspect, one or more embodiments relate to a method. The method includes transmitting a prompt to a large language model (LLM). The prompt includes an instruction to generate a first reasoning block. The method further includes computing a first token-level confidence score for the first reasoning block. The method further includes generating, by the LLM, a second reasoning block responsive to the first token-level confidence score failing to satisfy a pruning threshold. The method further includes computing a second token-level confidence score for the second reasoning block. Responsive to the second token-level confidence score satisfying the pruning threshold, the second reasoning block is added to a reasoning trace. The method further includes generating a provisional answer from the reasoning trace, responsive to the second token-level confidence score satisfying a block confidence threshold.

In general, in one aspect, one or more embodiments relate to a system. The system includes at least one computer processor, and a large language model (LLM), executing on the at least one computer processor. The LLM generates a first reasoning block and a second reasoning block from a natural language query. The system further includes a confidence-aware reasoning (CaR) controller, executing on the at least one computer processor. The CaR controller is configured for computing a first token-level confidence score for the first reasoning block. The CaR controller is further configured for invoking the LLM to generate a second reasoning block responsive to the first token-level confidence score failing to satisfy a pruning threshold. The CaR controller is further configured for computing a second token-level confidence score for the second reasoning block. The CaR controller is further configured for adding the second reasoning block to a reasoning trace, responsive to the second token-level confidence score satisfying the pruning threshold. The CaR controller is further configured for invoking the LLM to generate a provisional answer from the reasoning trace, responsive to the second token-level confidence score satisfying a block confidence threshold.

In general, in one aspect, one or more embodiments relate to a method. The method includes receiving a user query from a user application. The method further includes iteratively performing operations including generating a reasoning block using a large language model (LLM), based on the user query. The operations further include computing a token-level confidence score of the reasoning block. Responsive to the token-level confidence score failing to satisfy the pruning threshold, the operations further include obtaining, from the LLM, a multitude of alternative reasoning blocks. The operations further include selecting an alternative reasoning block having a highest corresponding token-level confidence score from the multitude of alternative reasoning blocks as the reasoning block. The operations further include appending the reasoning block to a reasoning trace. The operation further include generating a response based on the reasoning trace using the LLM. The operations further include transmitting the response over a communication network.

Other aspects of one or more embodiments will be apparent from the following description and the appended claims.

BRIEF DESCRIPTION OF DRAWINGS

FIGS. 3 and 4 show examples of a user query, and corresponding reasoning traces, in accordance with one or more embodiments.

Like elements in the various figures are denoted by like reference numerals for consistency.

DETAILED DESCRIPTION

Figure 1:
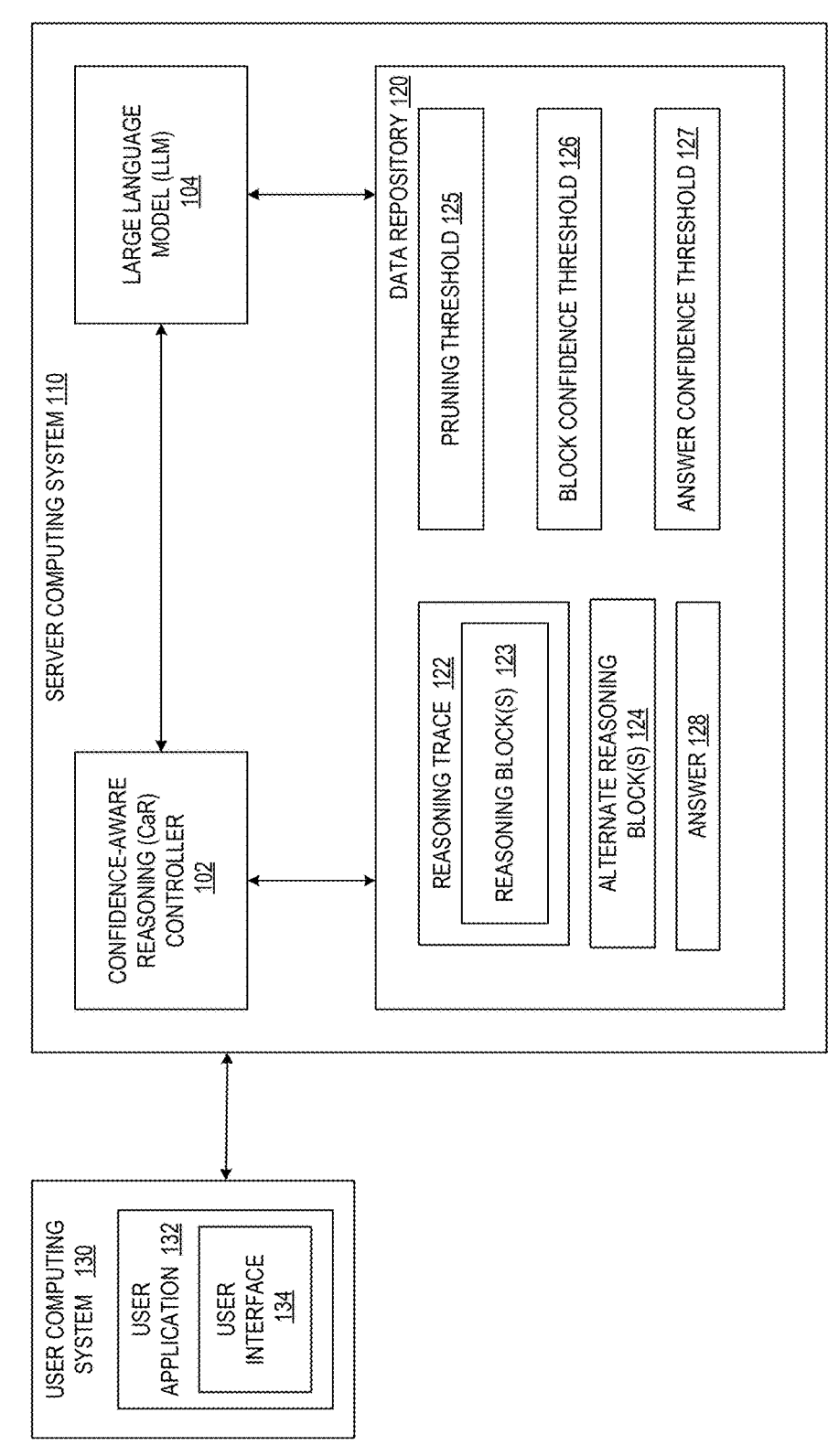
FIG. 1 shows a system, in accordance with one or more embodiments.

One or more embodiments are directed to a confidence-aware reasoning system. The reasoning system adaptively manages the depth and quality of reasoning performed by a large language model (LLM) during inference. The reasoning system may be managed by a Confidence aware Reasoning (CaR) controller that is a lightweight, decoding-time only wrapper process, interfacing with the LLM to obtain output of the decoder layers of the LLM. The output of the LLM may be one or more reasoning blocks. The CaR controller uses token-level confidence scores of the reasoning blocks as a proxy measure of expected information gain, to determine the utility of each reasoning block with respect to the overall reasoning trace. The token-level confidence scores are computed based on the average probability the LLM internally assigns to the tokens of a reasoning block in generating those specific tokens. The controller treats the LLM-generated internal score as a substitute measure (a proxy) for the block's true value, known as its "expected information gain" (EIG). EIG mathematically represents how much a given reasoning step is expected to reduce the model's uncertainty about the correct final answer A reasoning system refers to a software-as-a-service (SaaS) application that uses one or more LLMs as reasoning engines. When the reasoning system is deployed in a production environment, the CaR controller may be configured to receive a natural language query from a user application of the reasoning system and generate a prompt for the LLM. The prompt may include an instruction to generate a reasoning block. A token-level confidence score may be computed for the reasoning block. If the confidence score fails to satisfy a pruning threshold, the CaR controller may use a resampling mechanism, entailing invoking the LLM to generate a predefined number of alternative reasoning blocks. Further, an alternative reasoning block having a highest token-level confidence score value may be selected from the alternative reasoning blocks as a second reasoning block. A confidence score may be computed for the second reasoning block. If the second score satisfies the pruning threshold, the block may be added to a reasoning trace. If the second score also satisfies a block confidence threshold, which is greater than the pruning threshold, the controller may prompt the LLM to generate a provisional answer from the reasoning trace.

An answer confidence score may be computed for the provisional answer. If the answer confidence score satisfies an answer confidence threshold, the provisional answer may be transmitted over a communication network.

The CaR controller may operate entirely at decoding time, without modifying model parameters, affecting cost-efficient and accurate reasoning across a multitude of LLM platforms. The block confidence threshold and the answer confidence threshold serve as first and second confidence gates for affecting early stopping conditions of the reasoning generation process.

Attention is now turned to the figures. FIG. 1 shows a system (100), in accordance with one or more embodiments. The system (100) shown in FIG. 1 may include a server computing system (110). The server computing system (110) is one or more computer processors, data repositories, communication devices, and supporting hardware and software. The server computing system (110) may be in a distributed computing environment. The server computing system (110) includes a computer processor. The computer processor is one or more hardware or virtual processors which may execute computer readable program code that defines one or more applications, such as the confidence-aware reasoning (CaR) controller (102), and the large language model (LLM) (104). An example of the computer processor is described with respect to the computer processor(s) (502) of FIG. 5A. Thus, the server computing system (110) is configured to execute one or more applications, such as the CaR controller (102) and the LLM (104). An example of the server computing system (110) is described with respect to FIG. 5A and FIG. 5B.

The server computing system (110) shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

The data repository (120) may store intermediate and final data used during the reasoning process. The data repository (120) may include a reasoning trace (122). The reasoning trace is a sequence of one or more reasoning blocks (123). The reasoning blocks (123) may be accumulated into the reasoning trace (122) during inference of the LLM (104). A reasoning block (123) is a sequence of tokens generated by the LLM during decoding. The sequence of tokens forms a natural language utterance.

As used herein, a token refers to a discrete unit of text generated, processed, or interpreted by an LLM. Tokens are derived from input text via a tokenization process, which segments the text into sub-word units, words, or characters, depending on the LLM architecture and tokenizer configuration. A token may correspond to a complete word, a sub-word fragment, a punctuation mark, a special symbol or control character, a whitespace or formatting indicator, etc. Tokens serve as the atomic units of computation within the LLM. During inference or training, each token is embedded into a high-dimensional vector space and passed through successive layers of the model to generate contextual representations. The output of the LLM is typically a sequence of tokens, which may be decoded back into natural language utterances.

Accordingly, the reasoning block (123) may be one or more sentences or phrases, or a paragraph. Semantically, the reasoning block (123) may be an intermediate step in the LLM's process of reasoning an answer to the user query. That is, a reasoning block (123) is a natural language utterance that may correspond to a short chain-of-thought continuation. The data repository (120) may also include alternate reasoning block(s) (124) generated during resampling. The final output may be stored as an answer (128).

During inference, LLMs may produce responses without explicitly representing intermediate reasoning steps. To address this limitation, chain-of-thought reasoning has emerged as a technique for enhancing LLM performance and interpretability. The chain-of-thought reasoning technique refers to a structured approach in which an AI system generates a sequence of intermediate reasoning steps that lead to a final output or conclusion. In one or more embodiments, LLMs may be configured to perform chain-of-thought reasoning by generating a multi-step textual representation of its internal reasoning process. The reasoning sequence may include identification of relevant facts or premises, logical inference or deduction based on the identified facts/premises, intermediate conclusions or hypotheses, and a final resolution or answer to the posed query. Thus, the LLM may generate one or more natural language utterances articulating chain-of-thought "continuations" or intermediate reasoning steps, prior to generating the final response.

The chain-of-thought reasoning-based response generation may be explicitly prompted by the user, or implicitly learned through training on annotated datasets that include reasoning traces. In some implementations, the LLM may be fine-tuned using supervised learning techniques in which the training data comprises question-answer pairs accompanied by detailed reasoning paths.

The data repository (120) may further include thresholds that are parameters used by the CaR controller (102) to guide pruning and early stopping decisions. The thresholds are numerical values of the corresponding confidence values. The thresholds may include a pruning threshold (125), a block confidence threshold (126), and an answer confidence threshold (127). The confidence thresholds are token-level confidence thresholds of the reasoning blocks, or a provisional answer generated from the reasoning trace and a current reasoning block. Token-level means on a per token basis. The confidence thresholds serve as lightweight proxy measures to quantify the utility of each reasoning block when generated by the LLM (104). The pruning threshold (125) may be used to discard low-confidence reasoning blocks. Thus, if the token-level confidence score of a reasoning block (123) fails to satisfy the pruning threshold (125), the particular reasoning block (123) may be discarded. The block confidence threshold (126) may be used to trigger evaluation for early stopping. Thus, the token-level confidence score of a reasoning block (123) may satisfy the pruning threshold (125). At the same time, the token-level confidence score of the reasoning block (123) may further satisfy the block confidence threshold (126). In this case, a provisional answer may be generated from the reasoning trace (122) and the particular reasoning block (123). However, if the token-level confidence score of the reasoning block (123) falls between the pruning threshold (125) and the block confidence threshold (126), then the particular reasoning block (123) may be added to the reasoning trace (122).

Thus, the reasoning trace (122) may be considered to include a multitude of reasoning blocks (123) having respective token-level confidence scores satisfying the pruning threshold.

The answer confidence threshold (127) may be used to determine whether a provisional answer is sufficiently accurate to be returned as the final answer (128). Thus, a provisional answer may be generated based on the reasoning trace (122) and the current reasoning block (123). If the token-level confidence score of the provisional answer satisfies the answer confidence threshold (127), the provisional answer may be returned as the final answer (128).

The pruning threshold, block confidence threshold, answer confidence threshold may be collectively considered as reasoning parameters of the CaR controller. The reasoning parameters may be parameters of a reasoning system that includes the CaR controller and the LLM working in conjunction to process the query received from the user application. Thus, the reasoning parameters may be initialized when the reasoning system is deployed. Additionally, the reasoning parameters may further include a maximum number of tokens, or a token budget, of tokens that may be generated by the LLM in the process of reaching a final answer. A resampling trial count, referring to a predefined number of alternative reasoning blocks generated by the LLM as candidates for replacing a pruned reasoning block may further be included in the reasoning parameters.

The server computing system (110) further includes a CaR controller (102). The CaR controller (102) is software or application-specific hardware, which, when executing on a computer processor, operates as a decoding-time "wrapper" component to the LLM (104). In one or more embodiments, the CaR controller may intercept the output of the LLM decoder, namely, a reasoning block and determine, based on the confidence scores of the reasoning block, whether sufficient reasoning blocks have been generated. Notably, the CaR controller (102) may not modify internal LLM parameters. In one or more embodiments, the CaR controller may receive the natural language query from the user application (132) and generate a prompt for the LLM (104). The CaR controller (102) may further evaluate the reasoning block using token-level confidence scores and determine whether to prune, resample, or retain the block. The CaR controller (102) may further determine when to stop reasoning and generate a final answer (128), from the reasoning trace (122), based on the confidence thresholds.

In an example implementation, the CaR controller (102) may be implemented as a modular software library or microservice that integrates with the inference pipeline of the LLM (104). The CaR controller (102) may be deployed as a middleware layer that wraps around the LLM decoder interface. The CaR controller (102) may query the LLM decoder interface at the token sampling stage, to intercept the output logits or token probabilities produced by the decoder layer of the LLM (104).

In another example implementation, the CaR controller (102) may access the decoder output via hooks or callbacks exposed by the LLM's generation API. For example, in frameworks such as Hugging Face Transformers, the CaR controller (102) may register a post-processing function that receives the generated token sequence and associated log probabilities. The CaR controller (102) may then compute the average log probability across the reasoning block to derive a token-level confidence score.

The CaR controller (102) may be configured to operate synchronously with the LLM (104), evaluating each reasoning block immediately after generation. If the confidence score falls below the pruning threshold (125), the CaR controller (102) may be configured to adjust a decoding temperature parameter of the LLM (104) and re-invoke the generation function to produce a multitude of alternative reasoning blocks. The controller may then select an alternative reasoning block with the highest confidence score for inclusion in the reasoning trace (122). The CaR controller (102) may be designed to be model-agnostic, requiring no changes to the internal weights or architecture of the LLM (104). The CaR controller (102) may use native generation outputs and standard decoding interfaces, facilitating integration with diverse autoregressive LLMs.

The server computing system (110) further includes an LLM (104). In one or more embodiments, the LLM (104) may be an autoregressive LLM. Autoregressive LLMs are a class of language models that generate text by predicting the next token (word or sub-word) in a sequence, one token at a time, based on the previous tokens. The term "autoregressive" refers to the fact that the language model uses the language model's own previous outputs as part of the input for generating the next token. For example, if the model is given the prompt "Maxwell's equations describe," the language model will use that input to predict the next word-say, "electromagnetic"-then use "Maxwell's equations describe electromagnetic" to predict the next word, and so on. This process continues until the model produces a complete response or reaches a stopping condition. Autoregressive LLMs may be trained on massive datasets using a technique called causal language modeling, where the model learns to predict the next token in a sequence without looking ahead. Examples of autoregressive LLMs include GPT-2®, GPT-3®, GPT-4® from OpenAI®, and similar transformer-based models. Autoregressive LLMs have advanced capabilities in generating coherent, contextually relevant text, making them well-suited for tasks like conversation, storytelling, code generation, question answering, and reasoning for complex problem-solving.

Autoregressive LLMs may implement the transformer architecture, which is composed of three broad components: attention layers, encoder layers, and decoder layers. The attention mechanism, specifically, self-attention, weighs the importance of different tokens in a sequence when generating or interpreting each token. In autoregressive models, the attention mechanism may be implemented as masked self-attention, where each token may exclusively "attend" to previous tokens, ensuring that token generation proceeds left-to-right without peeking ahead.

In autoregressive LLMs, the encoder component may be omitted, stacked decoder layers used instead. The decoder layers, which may also be referred to as decoders, may include masked self-attention followed by feed-forward neural networks. Each decoder layer may process an input sequence, apply attention to previous tokens, and transform the result through nonlinear operations. The output of one decoder layer becomes the input to the next, allowing the model to build increasingly abstract representations of the input.

The system (100) includes a user computing system (130). The user computing system (130) may be considered remote or local. A remote user computing system may be operated by a third-party (e.g., an end user of a chatbot) that does not control or operate the system of FIG. 1. Similarly, the organization that controls the other elements of the system of FIG. 1 may not control or operate the remote user computing system. Thus, a remote user computing system may not be considered part of the system of FIG. 1. In contrast, a local user computing system is operated under the control of the organization that controls the other components of the system of FIG. 1. Thus, a local user computing system may be considered part of the system of FIG. 1.

The user computing system (130) is a computing system used by a user to submit a user query. The user computing system (130) may include a display for displaying the user interface (134) of a user application (132) and an input device for receiving input from the user. The user computing system (130) may further include a network interface for connecting the user computing system (130) to the server computing system (110). The user computing system (130) may be configured to execute the user application (132) with the user interface (134). In one or more embodiments, the user application (132) may be a web-based client application, operating within a web browser. Other embodiments of the user application (132) may include native desktop applications, mobile applications, remote desktop clients, etc. The user application (132) may be serviced by one or more software-as-a-service (SaaS) applications executing on the server computing system (110). For example, the SaaS application may be an office productivity based application (e.g., OFFICE 365®), a graphics based application, a financial application (e.g., QUICKBOOKS®), a multi-media application, a server-side reasoning system, or other type of application. The SaaS application may include the LLM (104). In one or more embodiments, the user application (132) may transmit a natural language query to the server computing system (110). The user interface (134) may display the final answer and optionally the reasoning trace to the user. The user application (132) may communicate with the CaR controller (102) over a communication network. The CaR controller (102) may receive queries from the user application (132) and transmit answers to the user application (132) over the communication network.

While FIG. 1 shows a configuration of components, other configurations may be used without departing from the scope of one or more embodiments. For example, various components may be combined to create a single component. As another example, the functionality performed by a single component may be performed by two or more components.

Figure 2:
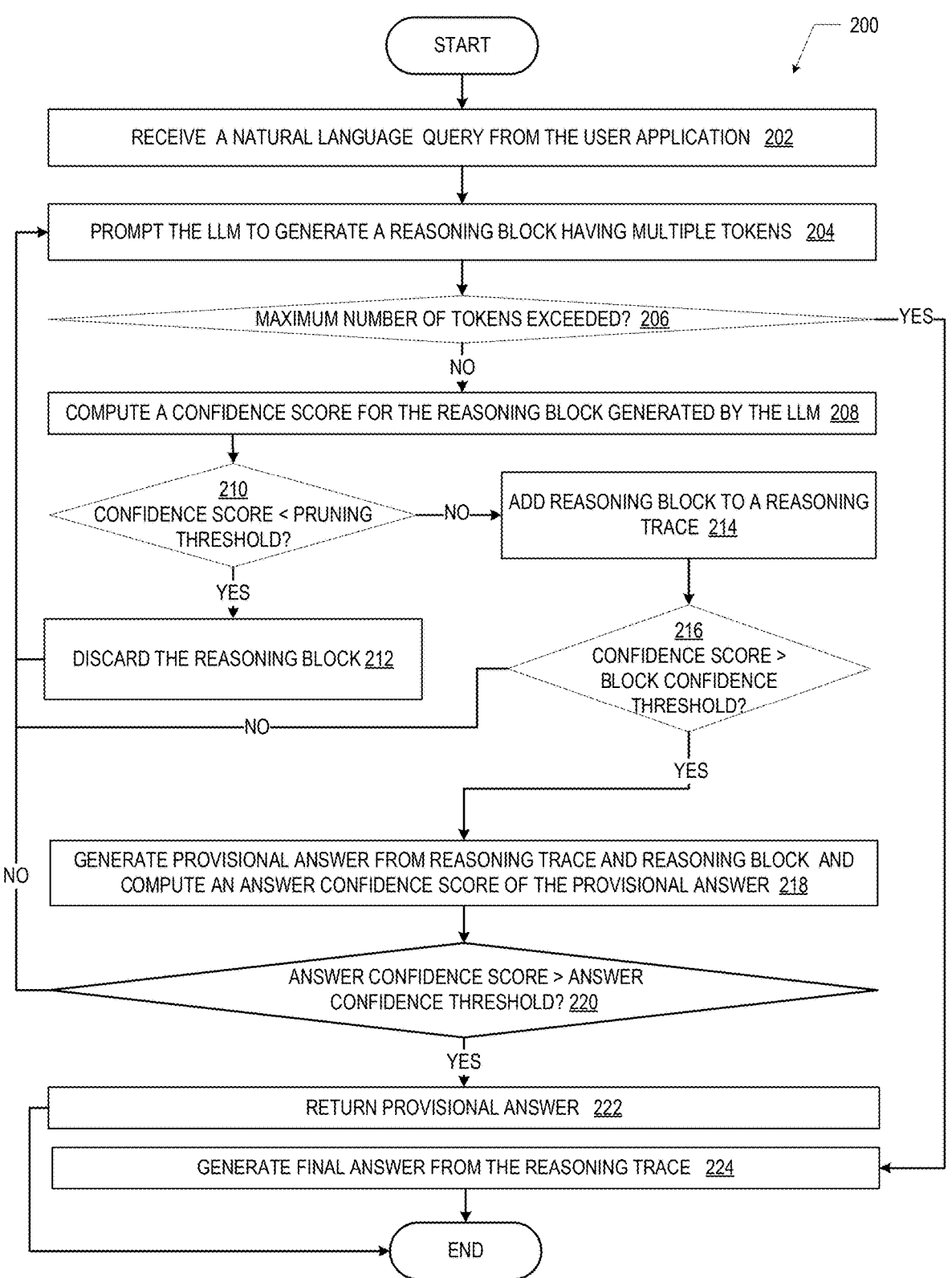
FIG. 2 shows a flowchart of a method, in accordance with one or more embodiments.

FIG. 2 shows a flowchart 200 of a method for confidence-aware control of reasoning steps of an LLM in generation of an answer, in accordance with one or more embodiments. The method of FIG. 2 may be implemented using the system of FIG. 1 and one or more of the steps may be performed on or received at one or more computer processors. While the various steps in the flowchart 200 are presented and described sequentially, at least some of the steps may be executed in different orders, may be combined or omitted, and at least some of the steps may be executed in parallel. Furthermore, the steps may be performed actively or passively.

The method of FIG. 2 may be considered as an implementation of an information-theoretic approach to determining the usefulness of a reasoning block in obtaining a final answer by an LLM. The approach of the method of FIG. 2 may use Bayesian Optimal Experimental Design (BOED). BOED refers to the process of selecting the most informative experiment or action that reduces uncertainty about a target variable or outcome. In the context of LLMs using reasoning to generate an answer to complex queries, BOED may be reinterpreted as the process of selecting reasoning steps that maximize the LLM's understanding or certainty about the correct final response. A reasoning step may be a natural language utterance, and may be considered as a "block" of tokens generated by the LLM that forms the natural language utterance.

Each intermediate reasoning block $r_t$ may be viewed as a local design decision $\xi_t$, chosen to reduce the LLM's epistemic uncertainty. Epistemic uncertainty refers to uncertainty due to lack of knowledge about the final response, or answer, A. A goal is to construct a reasoning trajectory, or trace, $R=\{r_1, \ldots, rt\}$ that produces a confident and accurate final answer. The reasoning trace R is a collection of reasoning blocks $r_1, r_2, \ldots, r_t$. Thus, if $R_{<t}=\{r_1, r_2, \ldots, r_{t-1}\}$ denotes the partial reasoning trajectory up to step t-1, then the final output consists of a full trajectory $R=R_{<t} \cup \{r_t\}$ and the answer A. To this end, the marginal utility of reasoning block $r_t$ over the answer distribution is defined in accordance with Equation (1):

$$EIG_A = \mathbb{E}_{A \sim p(\cdot | R_{<t}, r_t)} \left[ \log \frac{p(A \mid R_{<t}, r_t)}{p(A \mid R_{<t})} \right] \tag{1}$$

In Equation (1), EIGA quantifies the expected information contribution of $r_t$ toward the final answer A. Expected Information Gain (EIG) is a measure of how much a new observation or decision is expected to reduce uncertainty. In this context, the marginal utility of a reasoning block $rt$ may be defined as the conditional EIG over the answer distribution. In other words, the reasoning block is evaluated based on how much it is expected to improve the LLM's confidence in the final answer. Notably, the method of FIG. 2 approximates the EIG of a reasoning block using a monotonic function.

More particularly, the method of FIG. 2 approximates the EIGA of rt via a monotonic mapping of its confidence score:

$$EIG_A(r_t \mid \mathcal{R}_{<t}) \approx \varphi(\text{Conf}(r_t)) \tag{1a}$$

where $\varphi(\cdot)$ is an empirically calibrated function (e.g., identity, exponential, or entropy-based mapping) that serves as a surrogate for expected utility. The confidence score of a reasoning block rt may be computed as a function of the token-level confidence scores of the constituent tokens of the reasoning block rt.

Blocks with low predictive confidence may present as semantically vague or uninformative (e.g., filler phrases such as "Wait," "Wait, no," "Wait, but . . . "). On the other hand, high-confidence blocks may correlate with decisive and informative steps in the reasoning trajectory. Accordingly, the steps of flowchart 200 FIG. 2 are described in further reference to the information-theoretic approach described herein.

In Block 202, a natural language query is received from a user application. In one or more embodiments, the natural language query may be received by a CaR controller. The CaR controller may interface with the user application to extract the query for further processing.

In Block 204, a prompt is generated to invoke a large language model (LLM) to produce a reasoning block having multiple tokens. In one or more embodiments, the CaR controller may generate the prompt to the LLM from the natural language query. The prompt may include an instruction to generate a first reasoning block. The first reasoning block may be an intermediate reasoning step of the LLM. A reasoning block rt may include a sequence of tokens $$r_t = \{y_1^{(t)}, \dots, y_k^{(t)}\}.$$

In one or more embodiments, the first reasoning block may be generated ab initio by the LLM in a first iteration of Block 204. Thereafter, in subsequent iterations of Block 204, the first reasoning block may be generated based on the prior context. The prior context may be a cumulative context of the previous iterations of Block 204.

In one or more embodiments, the CaR controller may obtain from the decoder of the LLM, a multitude of tokens demarcated by a multitude of reasoning tokens. The multitude of tokens may constitute a natural language utterance. Further the CaR controller, may parse the multitude of tokens demarcated by the reasoning tokens to obtain the natural language utterance. The CaR controller may select the natural language utterance as the first reasoning block. Further, in one or more embodiments, the CaR controller may transmit the prompt to the LLM.

In Block 206, a check is performed to determine whether a maximum number of tokens has been generated. In one or more embodiments, the CaR controller may iteratively invoke the LLM to generate reasoning blocks until a predefined token budget is reached. The predefined token budget, which defines the maximum number of tokens, may be used to limit the length of the reasoning trace and prevent excessive or redundant reasoning. Thus, the CaR controller may be configured to iteratively perform invoking the LLM to generate a reasoning block based on the reasoning trace. Further, the CaR controller may add the reasoning block to the reasoning trace responsive to the token-level confidence score of the reasoning block satisfying the pruning threshold and failing to satisfy the block confidence threshold. Reasoning blocks may be added to the reasoning trace until a maximum number of tokens is generated by the LLM. Furthermore, responsive to the maximum number of tokens being generated by the LLM, the CaR controller may invoke the LLM to generate a final answer from the reasoning trace.

In Block 208, a token-level confidence score is computed for the reasoning block generated by the LLM. In one or more embodiments, the CaR controller may be configured to compute a first token-level confidence score for the first reasoning block. The token-level confidence score may be computed by the CaR controller as the average log probability of the tokens in the reasoning block. The token-level confidence score may be a normalized confidence score. In one or more embodiments, the token-level confidence score may be determined based on Equation (2):

$$Conf(r_t) = \exp\left(\frac{1}{|r_t|}\sum_{j=1}^{|r_t|}\log p_\theta\left(y_j^{(t)} \mid C_{j-1}\right)\right) \tag{2}$$

In Equation (2), $r_t$ is the th reasoning block;

$$r_t = \{y_1^{(t)}, \dots, y_k^{(t)}\}.$$

That is, the tokens $$\{y_1^{(t)}, \dots, y_k^{(t)}\}$$

comprise the $t^{th}$ reasoning block. C denotes the entire, or cumulative, previous "context". Thus, the token-level confidence $Conf(r_t)$ for the $t^{th}$ reasoning block is the average log probability of its tokens. The function $\log p_\theta$ computes the conditional probability of a token y, given the cumulative context C.

The token-level confidence score for the reasoning block may serve as a proxy for the expected information gain (EIG) of the block. Reasoning blocks with low confidence scores may correspond to semantically vague or uninformative phrases. Reasoning blocks with high confidence scores may correlate with decisive and informative reasoning steps.

In Block 210, a determination is made as to whether the confidence score is below a pruning threshold. In one or more embodiments, the pruning threshold may be set to a value such as $\tau_{low} \in (0, 0.6)$. If the confidence score falls below the pruning threshold, the reasoning block may be considered low-confidence and unlikely to yield nontrivial information gain. In this case, control then passes to Block 212. If the token-level confidence score satisfies the pruning threshold, control passes to Block 214.

In Block 212, the reasoning block is discarded. In one or more embodiments, responsive to the first token-level confidence score failing to satisfy the pruning threshold, the CaR controller may discard the first reasoning block.

Control then passes back to Block 204, where the CaR controller may invoke, or cause, the LLM to generate a second reasoning block. The CaR controller may configure the LLM to perform decoding with increased stochasticity, prior to generating the second reasoning block. Increased stochasticity may refer to generating outputs with greater variability and diversity. The stochasticity may be characterized, or configured, by an inference time configurable parameter of the LLM, referred to as "decoding temperature."

As a general overview, an LLM may generate text by selecting one token at a time based on a probability distribution over its vocabulary. This distribution may reflect how likely each token is to follow the previous ones, given the context. The LLM may typically choose the token with the highest probability, but may also sample from the distribution to introduce variation. Thus, the decoding temperature may be an inference time configuration parameter that influences how sharply or broadly the LLM interprets the probability distribution. A low "temperature" or value may make the distribution more peaked. In this case, the LLM may strongly favor the most likely token and behave more deterministically. A high temperature may flatten the distribution, making the model more likely to consider fewer probable tokens and produce more diverse or exploratory outputs. Thus, a higher decoding temperature may flatten the probability distribution over possible next tokens, allowing the model to explore less likely but potentially more informative alternatives. For example, in the initial iteration, the decoding temperature parameter may be set to 0.3. At this decoding temperature value, the LLM may consistently select the top-ranked token, producing concise and predictable reasoning blocks, resulting in highly focused and deterministic output. This decoding temperature parameter value may be used when precision and reliability are prioritized. In a subsequent iteration of generating the next reasoning block, the decoding temperature parameter may be set to 1.0. At this decoding temperature value, the probability distribution of the tokens may be flattened. Hence, the LLM may sample from a wider range of tokens. During resampling, the higher decoding temperature value may result in generation of alternative reasoning blocks that may offer higher information gain.

Accordingly, the CaR controller may invoke the configured LLM to generate a predefined number K of alternative reasoning blocks. Each alternative block may be evaluated for its token-level confidence score. The generation of the K alternative reasoning blocks and subsequent selection of the second reasoning block is a resampling mechanism. This resampling mechanism may serve as a lightweight form of importance sampling. The resampling mechanism may improve alignment between the LLM's output and the LLM's internal belief.

Further, from the K alternative reasoning blocks, an alternative reasoning block having the highest token-level confidence score may be selected. The alternative reasoning block selected may be considered as the block with the maximum information gain. In one or more embodiments, the alternative reasoning block may be selected from the K alternative reasoning blocks in accordance with Equation (3):

$$r_t^* = \underset{r_t^{(i)}}{\operatorname{argmax}} Conf\left(r_t^{(i)}\right), i = 1, \ldots, K \qquad (3)$$

In Equation (3), $r^*_t$ is the selected alternative reasoning block from the K alternative reasoning blocks, selected based on the value of the token-level confidence score of the alternative reasoning block. Thus, rt, which is the block with the highest score, may be selected as the second reasoning block. In one or more embodiments, if Conf $(r_t^*) > \tau_{low}$, then rt may be taken as the second reasoning block. In other embodiments, $r^*_t$ may be selected unconditionally to avoid infinite resampling and proceed to the subsequent iteration. Thus, in individual iterations of the execution loop including Blocks 204-216, new reasoning blocks may be generated by the LLM where the LLM may be dynamically configured for diverse decoding temperatures in the individual iteration.

In one or more embodiments, responsive to the first token-level confidence score falling below the pruning threshold, the CaR controller may perform operations including discarding the first reasoning block. The operations may further include obtaining, from the LLM, a first decoding temperature configuration parameter. The operations may further include configuring the LLM to perform token selection during decoding at a second decoding temperature parameter. The second decoding temperature parameter may be greater than the first decoding temperature configuration parameter. A configured LLM may be obtained in this manner. The CaR controller may further cause the configured LLM to generate a predefined number of alternative reasoning blocks, to obtain a multitude of alternative reasoning blocks. The multitude of alternative reasoning blocks may include the second reasoning block.

Further, the CaR controller may compute corresponding token-level confidence scores for respective alternative reasoning blocks of the multitude of alternative reasoning blocks. The corresponding token-level confidence scores are computed by the LLM, based on respective average log probabilities of tokens of the respective alternative reasoning blocks. The CaR controller may then select an alternative reasoning block with the highest token-level confidence score from the multitude of alternative reasoning blocks as the second reasoning block.

In Block 214, the reasoning block is added to the reasoning trace. In one or more embodiments, the reasoning trace may include a multitude of reasoning blocks. Respective reasoning blocks of the multitude of reasoning blocks may have token-level confidence scores that satisfy the pruning threshold. The reasoning trace may be used to accumulate intermediate reasoning steps for final answer generation. In one or more embodiments, responsive to the second token-level confidence score satisfying the pruning threshold, the second reasoning block may be added to the reasoning trace.

In Block 216, a determination is made as to whether the token-level confidence score (of the reasoning block) satisfies a block confidence threshold. The block confidence threshold may be greater than the pruning threshold. In one or more embodiments, the block confidence threshold may correspond to a first stage confidence "gate." The block confidence threshold may be defined as $\tau_{high} \in (0.7, 0.9)$. If the token-level confidence score satisfies this threshold, the CaR controller may hypothesize that the model has reached a confident and informative state in its trajectory. On the other hand, if the token-level confidence score fails to satisfy the block confidence score, control passes back to Block 204, in which the next reasoning block is generated.

In Block 218, a provisional answer is generated from the reasoning trace, and an answer confidence score of the provisional answer is computed. The CaR controller may prompt the LLM to generate a provisional answer sequence $A_t = _1, \ldots, a|A_t|$. Here, $A_t$ is the provisional answer, comprising answer tokens $a_1, \ldots, a_{|A_t|}$. The answer confidence score may be computed as the average log probability of the answer tokens. If the score exceeds a stricter threshold $\tau_{ans} \in (0.9, 1.0)$, the reasoning process may be considered complete. In one or more embodiments, the answer confidence score may be computed in accordance with Equation (4):

$$Conf(A_t) = \exp\left(\frac{1}{|A_t|} \sum_{j=1}^{|A_t|} \log p_\theta(a_j \mid R, a_{<j})\right) \qquad (4)$$

In Equation (4), At is the provisional answer, $\text{Conf}(A_t)$ is the answer confidence score, $a_j$ is the $j^{th}$ answer token, and R is the reasoning trace.

In Block 220, a determination is made as to whether the answer confidence score satisfies the answer confidence threshold. In one or more embodiments, this step may correspond to a second-stage confidence gate. In one or more embodiments, the answer confidence threshold may be used to confirm that the model's predictive posterior over the answer is sufficiently peaked. This condition may correspond to a low entropy state in which the uncertainty of the answer distribution is minimal. The entropy budget may be defined by a user to ensure reliability of the final output.

In Block 222, the provisional answer is returned as the final answer. In one or more embodiments, responsive to the answer confidence score satisfying an answer confidence threshold, the CaR controller may transmit the provisional answer over a communication network, to the user application. A special delimiter token such as "<\think>" may be inserted to signal the end of the reasoning phase. On the other hand, if the answer confidence score fails to satisfy the answer confidence threshold, the provisional answer may be discarded, and control may pass back to Block 204 to generate the next reasoning block.

In Block 224, a final answer is generated from the reasoning trace. In one or more embodiments, if the maximum number of tokens has been reached or the answer confidence score fails to satisfy the answer confidence threshold, the CaR controller may invoke the LLM to generate a final response from the accumulated reasoning trace. This fallback mechanism may ensure that a final answer is produced regardless of if the early stopping conditions are not being met.

FIGS. 3 and 4 show an example of a complex query to the LLM, and the LLM's reasoning process which results in an incorrect answer, in accordance with one or more embodiments. The following example is for explanatory purposes only and not intended to limit the scope of one or more embodiments.

In Block 302, the question is introduced, asking which of Maxwell's equations would be different in a parallel universe where magnetic monopoles exist. The multiple-choice options are presented with semantic distinctions that are crucial to the reasoning process. For instance, the option "The ones related to the divergence and the curl of the magnetic field" is explicitly listed, which corresponds to option (C), the correct answer. However, this option is not given sufficient attention in the LLM's subsequent reasoning, despite being the only one that correctly identifies both affected equations.

In Block 304, the LLM begins its reasoning trace by recalling the standard Maxwell equations and identifying which ones involve the divergence or curl of the magnetic field. The LLM correctly notes that Gauss's law for magnetism (div B=0) would change due to the presence of magnetic monopoles. However, it does not yet isolate the impact on the curl of the magnetic field. The reasoning begins to drift toward a fixation on divergence alone, without considering the full implications of magnetic current on Ampère's law.

In Block 306, the LLM attempts to match the changed equations to the answer choices. It states, for instance, "(2) is different, equation (4) is different" and concludes that "(A) is correct because it's different from equation (2)." These statements show that the LLM is focused on divergence (equation 2 of Block 304) and magnetic charge (equation 4 of Block 304) but fails to consider the curl of the magnetic field, which would also change due to magnetic current. This omission leads to overlooking option (C), which is the only one that includes both divergence and curl of the magnetic field. Furthermore, A is an answer choice, and equation (2) is part of the problem statement. The LLM conflates the equation with the answer choice.

Turning to FIG. 4, in Block 402, the LLM continues evaluating the equations and says, "(2) div B=0, which is different, equation (4) div B=∂p/∂t+μ0m. So both (2) and (4)" and then reflects, "So perhaps I'm misunderstanding." This moment of hesitation reveals that the LLM is aware of a gap in its reasoning but does not resolve it. The focus remains on divergence and magnetic charge, and the LLM does not recognize that the curl of B (Ampère's law) would also be modified to include magnetic current.

In Block 404, the LLM performs a final breakdown of the equations under the changed condition. The LLM states, "(1): div E=$\rho_e$ Not affected Equation (2): div B=0 Affected because div B≠0 Equation (3): curl E=–dB/dt Not affected Equation (4): div B=0 ∂$\rho_m$/∂t+μ0m Affected because div B≠0" and then reviews the answer choices. The LLM quotes, "(C), the one related to divergence and curl of magnetic field," but does not select it. This confirms the observation that the LLM fails to apply the changed condition to the curl of the magnetic field and overlooks the correct answer, despite explicitly referencing it.

The quoted segments from the blocks show how the LLM's reasoning becomes increasingly focused on divergence and magnetic charge, while neglecting the implications for the curl of the magnetic field. The quoted content serves as evidence of the LLM's attention and confusion, validating the observation that it fails to consider option (C), which correctly identifies both affected equations.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
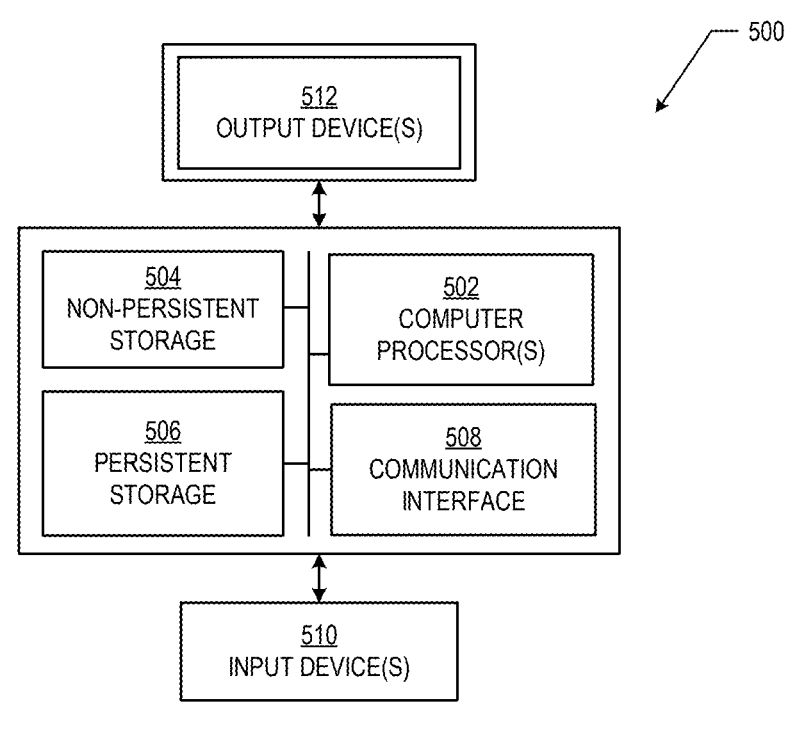
FIG. 5A and FIG. 5B show a computing system and network environment, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or microcores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
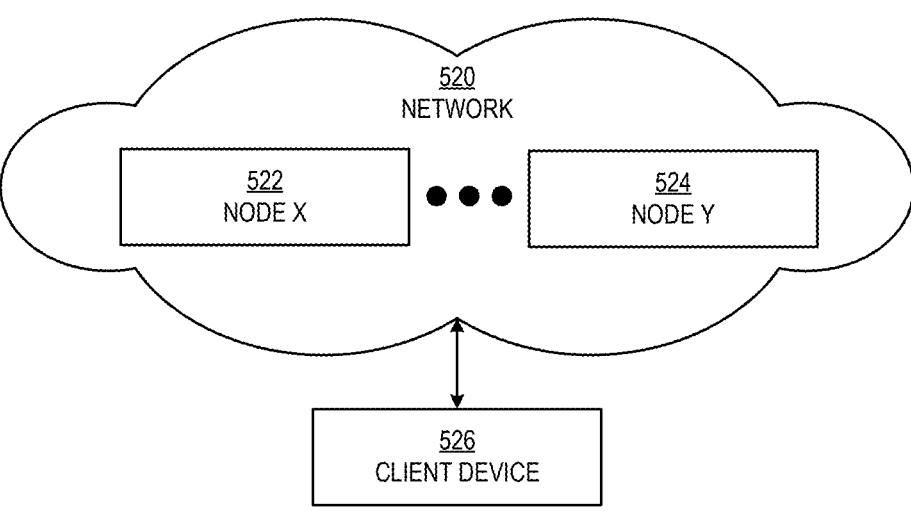

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

transmitting a prompt to a large language model (LLM), the prompt comprising an instruction to generate a first reasoning block;

computing a first token-level confidence score for the first reasoning block;

responsive to the first token-level confidence score failing to satisfy a pruning threshold:

discarding the first reasoning block, obtaining, from the LLM, a first decoding temperature configuration parameter, configuring the LLM to perform token selection during decoding at a second decoding temperature parameter, wherein the second decoding temperature parameter is greater than the first decoding temperature configuration parameter, and triggering generating, by the LLM, a second reasoning block after configuring the LLM;

computing a second token-level confidence score for the second reasoning block;

adding the second reasoning block to a reasoning trace responsive to the second token-level confidence score satisfying the pruning threshold; and generating a provisional answer from the reasoning trace responsive to the second token-level confidence score satisfying a block confidence threshold.

2. The method of claim 1, further comprising:

receiving a natural language query from a user application; and generating the prompt to the LLM from the natural language query.

3. The method of claim 1, further comprising:

computing an answer confidence score for the provisional answer; and responsive to the answer confidence score satisfying an answer confidence threshold, transmitting the provisional answer over a communication network.

4. The method of claim 1, further comprising:

computing an answer confidence score for the provisional answer; and responsive to the answer confidence score failing to satisfy an answer confidence threshold, discarding the provisional answer.

5. The method of claim 1, further comprising:

generating, by a decoder of the LLM, the first reasoning block, wherein the first reasoning block is an intermediate reasoning step of the LLM, wherein the reasoning trace comprises a plurality of reasoning blocks having respective token-level confidence scores satisfying the pruning threshold.

6. The method of claim 1, further comprising:

obtaining from a decoder of the LLM, a plurality of tokens demarcated by a plurality of reasoning tokens, wherein the plurality of tokens comprises a natural language utterance;

parsing the plurality of tokens demarcated by the plurality of reasoning tokens to obtain the natural language utterance; and selecting the natural language utterance as the first reasoning block.

7. The method of claim 1, further comprising:

invoking the LLM to generate a predefined number of alternative reasoning blocks, to obtain a plurality of alternative reasoning blocks comprising the second reasoning block.

8. The method of claim 1, further comprising:

obtaining, from the LLM, a plurality of alternative reasoning blocks;

computing a plurality of corresponding token-level confidence scores for respective alternative reasoning blocks of the plurality of alternative reasoning blocks; and selecting an alternative reasoning block with a highest token-level confidence score, of the plurality of corresponding token-level confidence scores, from the plurality of alternative reasoning blocks as the second reasoning block.

9. The method of claim 1, wherein the first token-level confidence score is computed as an average log probability of a plurality of tokens of the first reasoning block computed by the LLM.

10. A method, comprising:

transmitting a prompt to a large language model (LLM), the prompt comprising an instruction to generate a first reasoning block;

computing a first token-level confidence score for the first reasoning block;

iteratively performing, until a maximum number of tokens is generated by the LLM:

invoking the LLM to generate a subsequent reasoning block based on a reasoning trace responsive to a prior token-level confidence score failing to satisfy a pruning threshold, the prior token-level confidence score being the first token-level confidence score in a first iteration, and adding the subsequent reasoning block to the reasoning trace responsive to a subsequent token-level confidence score of the reasoning block satisfying the pruning threshold and failing to satisfy a block confidence threshold; and generating a provisional answer from the reasoning trace responsive to a second token-level confidence score satisfying the block confidence threshold.

11. The method of claim 10, further comprising:

responsive to the maximum number of tokens being generated by the LLM, invoking the LLM to generate a final answer from the reasoning trace.

12. A system, comprising:

at least one computer processor;

a large language model (LLM), executing on the at least one computer processor for generating a first reasoning block and a second reasoning block from a natural language query; and a confidence-aware reasoning (CaR) controller, executing on the at least one computer processor, and configured for:

computing a first token-level confidence score for the first reasoning block, responsive to the first token-level confidence score failing to satisfy a pruning threshold:

discarding the first reasoning block, obtaining, from the LLM, a first decoding temperature configuration parameter, configuring the LLM to perform token selection during decoding at a second decoding temperature parameter, wherein the second decoding temperature parameter is greater than the first decoding temperature configuration parameter, and triggering generating, by the LLM, a second reasoning block after configuring the LLM, computing a second token-level confidence score for the second reasoning block, adding the second reasoning block to a reasoning trace responsive to the second token-level confidence score satisfying the pruning threshold, and invoking the LLM to generate a provisional answer from the reasoning trace responsive to the second token-level confidence score satisfying a block confidence threshold.

13. The system of claim 12, wherein the CaR controller is further configured for:

computing an answer confidence score for the provisional answer, responsive to the answer confidence score satisfying an answer confidence threshold, transmitting the provisional answer over a communication network, and responsive to the answer confidence score failing to satisfy the answer confidence threshold, discarding the provisional answer.

14. The system of claim 12, wherein the CaR controller is further configured for:

obtaining from a decoder of the LLM, a plurality of tokens demarcated by a plurality of reasoning tokens, wherein the plurality of tokens comprises a natural language utterance;

parsing the plurality of tokens demarcated by the plurality of reasoning tokens to obtain the natural language utterance; and selecting the natural language utterance as the first reasoning block.

15. The system of claim 12, wherein the CaR controller is further configured for:

computing a plurality of corresponding token-level confidence scores for respective alternative reasoning blocks of a plurality of alternative reasoning blocks, wherein the corresponding token-level confidence scores are computed by the LLM, based on respective average log probabilities of tokens of the respective alternative reasoning blocks; and selecting an alternative reasoning block with a highest token-level confidence score, of the plurality of corresponding token-level confidence scores, from the plurality of alternative reasoning blocks as the second reasoning block.

16. The system of claim 12, wherein the CaR controller is further configured for:

iteratively performing:

invoking the LLM to generate a reasoning block based on the reasoning trace, and adding the reasoning block to the reasoning trace responsive to a token-level confidence score of the reasoning block satisfying the pruning threshold and failing to satisfy the block confidence threshold.

17. A method, comprising:

receiving a user query from a user application;

iteratively performing operations comprising:

generating a reasoning block using a large language model (LLM) configured to perform token selection at a first decoding temperature parameter, based on the user query, computing a token-level confidence score of the reasoning block, responsive to the token-level confidence score failing to satisfy a pruning threshold:

discarding the reasoning block, configuring the LLM to perform token selection during decoding at a second decoding temperature parameter, wherein the second decoding temperature parameter is greater than the first decoding temperature parameter, obtaining, from the LLM, a plurality of alternative reasoning blocks, and selecting an alternative reasoning block having a highest corresponding token-level confidence score from the plurality of alternative reasoning blocks as the reasoning block, and appending the reasoning block to a reasoning trace;

generating a response based on the reasoning trace using the LLM; and transmitting the response over a communication network.

18. The method of claim 17, further comprising:

responsive to the token-level confidence score of the reasoning block satisfying a block confidence threshold, performing operations comprising:

invoking the LLM to generate a provisional answer from the reasoning trace, computing an answer confidence score for the provisional answer, and responsive to the answer confidence score satisfying an answer confidence threshold, terminating performing the operations.

* * * * *